(12) United States Patent
Sun et al.

(10) Patent No.: US 9,307,389 B2
(45) Date of Patent: Apr. 5, 2016

(54) METHOD, SYSTEM, AND EQUIPMENTS FOR MOBILITY MANAGEMENT OF GROUP TERMINALS

(75) Inventors: Aifang Sun, Shenzhen (CN); Jianfu Cao, Shenzhen (CN); Zhihao Ling, Shenzhen (CN); Chong Gao, Shenzhen (CN); Yifeng Yuan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 24 days.

(21) Appl. No.: 14/370,050

(22) PCT Filed: Mar. 22, 2012

(86) PCT No.: PCT/CN2012/072853
§ 371 (c)(1),
(2), (4) Date: Jun. 30, 2014

(87) PCT Pub. No.: WO2013/104147
PCT Pub. Date: Jul. 18, 2013

(65) Prior Publication Data
US 2014/0370927 A1   Dec. 18, 2014

(30) Foreign Application Priority Data

Jan. 13, 2012   (CN) .......................... 2012 1 0011167

(51) Int. Cl.
*H04B 7/00* (2006.01)
*H04W 8/02* (2009.01)
(Continued)

(52) U.S. Cl.
CPC ................ *H04W 8/02* (2013.01); *H04L 67/16* (2013.01); *H04W 4/001* (2013.01); *H04W 4/08* (2013.01);
(Continued)

(58) Field of Classification Search
CPC ....... H04W 4/08; H04W 4/005; H04W 8/186; H04W 12/08; H04W 8/02; H04W 12/04; H04W 4/00; H04W 8/12
USPC ........... 455/518, 519, 500, 517, 414.1–414.4, 455/445, 550.1, 422.1, 403, 416, 446, 450, 455/509, 455, 507, 508, 513, 515, 516; 370/252, 310, 328, 329, 338, 259, 260, 370/261
See application file for complete search history.

(56) References Cited

U.S. PATENT DOCUMENTS

| 2008/0261580 A1 | 10/2008 | Wallentin et al. |
| 2010/0056175 A1 | 3/2010 | Bachmann |

(Continued)

FOREIGN PATENT DOCUMENTS

| CN | 101263684 A | 9/2008 |
| CN | 101365242 A | 2/2009 |

(Continued)

OTHER PUBLICATIONS

International Search Report in international application No. PCT/CN2012/072853, mailed on Oct. 25, 2012. (2 pages—see entire document).

(Continued)

*Primary Examiner* — Keith Ferguson
(74) *Attorney, Agent, or Firm* — Oppedahl Patent Law Firm LLC

(57) ABSTRACT

Disclosed is a method for mobility management of group terminals, where a mobility management platform sends a request for calling a service to a terminal of a group, and determines a terminal responding to the request for calling the service as a service center of the service; and the service center of the service configures a terminal environment according to the request for calling the service to which the service center of the service responds, and uploads information on the configured terminal environment to the mobility management platform. Also disclosed are a system and equipments for mobility management of group terminals. With a solution of the disclosure, in the case of multiple services, it is possible to select, from different terminals, a terminal as a service center according to the service, thereby avoiding a ping-pong effect, increasing utilization efficiency of network resources, enhancing optimal user experience of QoS, and meeting a management requirement in parallel transmission of multiple service flows in a ubiquitous network.

15 Claims, 3 Drawing Sheets

---

101. a mobility management platform sends a request for calling a service to a terminal of a group, and determines a terminal responding to the request for calling the service as a service center of the service 102. the service center of the service configures a terminal environment according to the request for calling the service to which the service center of the service responds, and uploads information on the configured terminal environment to the mobility management platform

(51) Int. Cl.
    *H04W 4/08*    (2009.01)
    *H04W 12/08*   (2009.01)
    *H04W 4/20*    (2009.01)
    *H04W 8/18*    (2009.01)
    *H04L 29/08*   (2006.01)
    *H04W 4/00*    (2009.01)
    *H04W 8/24*    (2009.01)

(52) U.S. Cl.
    CPC .............. *H04W 4/206* (2013.01); *H04W 8/186* (2013.01); *H04W 12/08* (2013.01); *H04W 4/003* (2013.01); *H04W 4/005* (2013.01); *H04W 8/24* (2013.01)

(56) References Cited

U.S. PATENT DOCUMENTS

| | | | |
|---|---|---|---|
| 2011/0128946 | A1 | 6/2011 | Saito |
| 2012/0149309 | A1* | 6/2012 | Hubner ................. H04W 4/023 455/67.11 |

FOREIGN PATENT DOCUMENTS

| | | |
|---|---|---|
| CN | 101605345 A | 12/2009 |
| CN | 101674662 A | 3/2010 |
| CN | 101951557 A | 1/2011 |
| EP | 1860904 A1 | 11/2007 |
| EP | 2328368 A1 | 6/2011 |
| JP | 2006526932 A | 11/2006 |
| JP | 2010178193 A | 8/2010 |
| JP | 2011114765 A | 6/2011 |
| WO | 2011137597 A1 | 11/2011 |

OTHER PUBLICATIONS

English Translation of the Written Opinion of the International Search Authority in international application No. PCT/CN2012/072853, mailed on Oct. 25, 2012. (5 pages—see entire document).
Supplementary European Search Report in European application No. 12864879.7, mailed on Nov. 11, 2015.
System Architecture Evolution—wikipedia, the free encyclopedia, mailed on Dec. 11, 2011.

* cited by examiner

METHOD, SYSTEM, AND EQUIPMENTS FOR MOBILITY MANAGEMENT OF GROUP TERMINALS

TECHNICAL FIELD

The present disclosure relates to technology of mobility management of group terminals, and in an embodiment to a method, system, and equipments for mobility management of group terminals based on multiple services and multiple centers.

BACKGROUND

With the ongoing development of network communication technology, there are increasing user demands for better network Quality-of-Service and service experience. Particularly, under the circumstance of a ubiquitous network, when there are numerous mobile terminal equipments around a user, it is required to effectively manage the mobile terminal equipments for improving efficiency of collaboration among the terminals and continuity of a ubiquitous service and providing the user with optimal experience of quality of service (QoS). However, an existing method for mobility management of group terminals fails to provide any effective solution for collaborative use of network resources among heterogeneous wireless networks when multiple service flows are transmitted in parallel in a ubiquitous network, and also fails to provide any effective measure for handling a situation such as service interruption due to single-point failure, a network coverage issue and the like in large-scale movement of a large number of nodes in a physical space and a heterogeneous-network space, thereby affecting service continuity and reducing user experience of QoS.

A preferred method for mobility management of group terminals with a single center is proposed in a patent document titled "Method, system and terminal for temporary group management based on terminal cooperation" (Chinese Patent Application No. 201010290185.6, Publication No. CN101951557A), where according to a cooperation request of a terminal, a management platform sets the terminal sending the cooperation request as a temporary manager of a group to manage a large number of nodes in the group, reducing dependence of group management on an external device and improving efficiency in executing a terminal cooperation service. However, with this method, when single-point failure occurs due to damage to the temporary manager of the group or a network coverage issue, and the like, the mobility management of group terminals will crash; meanwhile, in a scenario such as parallel transmission of multiple service flows in a ubiquitous network, due to limited capability per se, the temporary manager of the group cannot achieve efficient collaboration among the nodes in the group between multiple services and multiple access networks, and cannot meet a management requirement in parallel transmission of multiple service flows in the ubiquitous network, thereby reducing user experience of QoS.

SUMMARY

In view of this, it is desired that embodiments of the disclosure provide a method, system and equipments for mobility management of group terminals, capable of increasing utilization efficiency of network resources, meeting a management requirement in parallel transmission of multiple service flows in a ubiquitous network, and providing a solution for service interruption due to single-point failure.

To this end, a technical solution of the disclosure is implemented as follows.

The disclosure provides a method for mobility management of group terminals, including steps of:

sending, by a mobility management platform, a request for calling a service to a terminal of a group, and determining a terminal responding to the request for calling the service as a service center of the service; and configuring, by the service center of the service, a terminal environment according to the request for calling the service to which the service center of the service responds, and uploading information on the configured terminal environment to the mobility management platform.

In an embodiment, the step of determining a terminal responding to the request for calling the service as a service center of the service may be: generating, by the mobility management platform, a weighted terminal-ranking list of any terminal responding to the request for calling the service via an analytic hierarchy process; sending a service-center authenticating message to a terminal with a maximal weight in the weighted terminal-ranking list; and after receiving an approving message returned by the terminal with the maximal weight in the weighted terminal-ranking list, informing a terminal responding to the request for calling the service other than the service center of the determination of the terminal with the maximal weight in the weighted terminal-ranking list as the service center.

In an embodiment, the request for calling the service may include a type of the service and a priority of the service; and a terminal may respond to the received request for calling the service when it is determined that a capability of the terminal matches the type of the service and the terminal is in an idle state, or when it is determined that a capability of the terminal matches the type of the service, the terminal is in an operating state, and the requested service has a high priority.

In an embodiment, the service-center authenticating message may include a service-center-replacement triggering condition.

In an embodiment, the method may further include steps of: when the service center meets the service-center-replacement triggering condition, sending, by the service center, a service-center-replacement application to the mobility management platform, and after receiving application-approved information sent by the mobility management platform, selecting a service center other than the service center itself as a temporary service center; after the mobility management platform determines a new service center according to the weighted terminal-ranking list, replacing, by the new service center, the temporary service center in configuring the terminal environment and uploading the information on the configured terminal environment to the mobility management platform.

In an embodiment, the method may further include steps of: after receiving a request for the service, extracting, by the mobility management platform, information on a type of the service and a priority of the service in the request for the service, collecting a communication parameter of a wireless network, assigning a weight to the communication parameter, and allocating a wireless network resource for the service based on fuzzy logics and neural network technology.

In an embodiment, the step of allocating a wireless network resource for the service based on fuzzy logics and neural network technology may be: acquiring a network-access-decision parameter by performing network-access calculation on the collected communication parameter based on a particle-swarm-optimization fuzzy neuron, and allocating the wireless network resource for the requested service according to the network-access-decision parameter.

In an embodiment, service centers may transmit service flows in parallel.

A system for mobility management of group terminals provided in the disclosure includes a mobility management platform and a service center, wherein the mobility management platform is configured for: sending a request for calling a service to a terminal of a group, and determining a terminal that responds to the request for calling the service as the service center of the service; and the service center is configured for: configuring a terminal environment according to the request for calling the service to which the service center responds, and uploading information on the configured terminal environment to the mobility management platform.

In an embodiment, the mobility management platform may include a service management module configured for: sending the request for calling the service to a terminal of the group, and determining a terminal that responds to the request for calling the service as the service center of the service.

In an embodiment, the mobility management platform may include a wireless-channel allocating module configured for: after receiving a request for the service, extracting information on a type of the service and a priority of the service in the request for the service, collecting a communication parameter of a wireless network, assigning a weight to the communication parameter, and allocating a wireless network resource for the service based on fuzzy logics and neural network technology.

In an embodiment, the mobility management platform may include a node managing module configured for: after receiving a service-center-replacement application sent by the service center, returning application-approved information, determining a new service center according to a weighted terminal-ranking list, and sending a service flow according to the information on the terminal environment uploaded by the new service center.

In an embodiment, the service center may include a service responding module and an environment configuring module, wherein the service responding module may be configured for: receiving and responding to the request for calling the service sent by the mobility management platform; and the environment configuring module may be configured for configuring the terminal environment according to the request for calling the service, and uploading information on the configured terminal environment to the mobility management platform.

In an embodiment, the service responding module may specifically be configured for: after receiving the request for calling the service sent by the mobility management platform, responding to the request for calling the service when it is determined that a capability of the terminal matches a type of the service and the terminal is in an idle state, or when it is determined that a capability of the terminal matches a type of the service, the terminal is in an operating state, and the requested service has a high priority.

In an embodiment, the service center may include a single-point-failure handling module configured for: when the service center meets a service-center-replacement triggering condition, sending a service-center-replacement application to the mobility management platform, and after receiving application-approved information sent by the mobility management platform, selecting a service center other than the local service center as a temporary service center.

A mobility management platform provided in the disclosure includes a service management module configured for: sending a request for calling a service to a terminal of a group, and determining a terminal that responds to the request for calling the service as a service center of the service.

A service center provided in the disclosure specifically includes:

a service responding module configured for receiving and responding to a request for calling a service sent by a mobility management platform; and an environment configuring module configured for configuring a terminal environment according to the request for calling the service, and uploading information on the configured terminal environment to the mobility management platform.

The present disclosure provides a method, system and equipments for mobility management of group terminals, where a mobility management platform sends a request for calling a service to a terminal of a group, and determines a terminal responding to the request for calling the service as a service center of the service; and the service center of the service configures a terminal environment according to the request for calling the service to which the service center of the service responds, and uploads information on the configured terminal environment to the mobility management platform. In this way, in the case of multiple services, it is possible for a mobility management platform to select, from different terminals, a terminal as a service center according to the service, thereby avoiding a ping-pong effect, increasing utilization efficiency of network resources, enhancing optimal user experience of QoS, and meeting a management requirement in parallel transmission of multiple service flows in a ubiquitous network. In addition, when a single-point failure occurs at a service center, the mobility management platform automatically selects a terminal under the management of the service center as a new service center, avoiding service interruption caused by a single-point failure, improving reliability and continuity during service flow execution.

DETAILED DESCRIPTION

According to embodiments of the disclosure, a mobility management platform sends a request for calling a service to a terminal of a group, and determines a terminal responding to the request for calling the service as a service center of the service; and the service center of the service configures a terminal environment according to the request for calling the service to which the service center of the service responds, and uploads information on the configured terminal environment to the mobility management platform.

The disclosure is further elaborated below with reference to accompanying drawings and specific embodiments.

Figure 1:
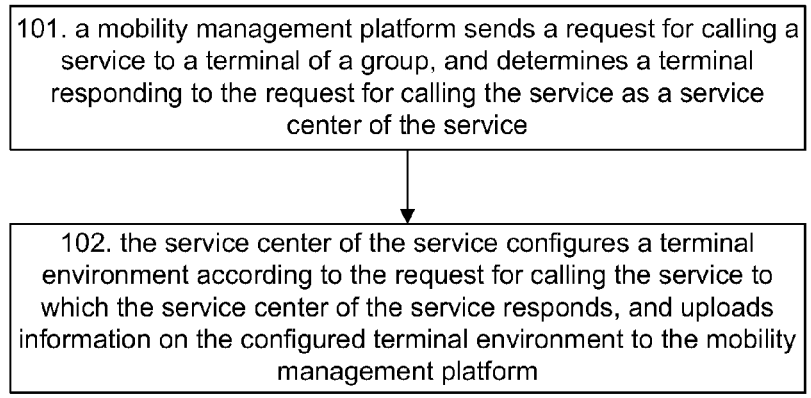
FIG. 1 is a flow chart of a method for mobility management of group terminals based on multiple services and multiple centers implemented according to the disclosure.

A method for mobility management of group terminals based on multiple services and multiple centers is implemented in the disclosure. As shown in FIG. 1, the method may include steps as follows.

In step 101, a mobility management platform sends a request for calling a service to a terminal of a group, and determines a terminal responding to the request for calling the service as a service center of the service.

In an embodiment, after receiving requests for various services, the mobility management platform sends the request for calling a service to each terminal in the group. A terminal receiving the request for calling the service determines whether to respond to the request for calling the service based on a service status per se and the request for calling the service, and sends, when the terminal determines to respond to the request for calling the service, a response to the request for calling the service to the mobility management platform. The mobility management platform generates a weighted terminal-ranking list of any terminal responding to the request for calling the service via an analytic hierarchy process; sends a service-center authenticating message to a terminal with a maximal weight in the weighted terminal-ranking list; and after receiving an approving message returned by the terminal with the maximal weight in the weighted terminal-ranking list, informs a terminal responding to the request for calling the service other than the service center of the determination of the terminal with the maximal weight in the weighted terminal-ranking list as the service center. A link is established between the service center and a terminal responding to the request for calling the service other than the service center to form a sub-group.

Generally, a request for a service is sent by a user through a terminal.

A request for calling a service may include a type of the service and a priority of the service, the type of the service including a video service, a voice service, a short message service, etc.

A terminal receiving a request for calling a service may determine whether to respond to the request for calling the service by steps of A. determining whether a capability of the terminal matches the type of the service; refusing to respond to the request for calling the service if the capability of the terminal does not match the type of the service, or performing step B if they match;

B. determining a state of the terminal; and responding to the received request for calling the service if the terminal is in an idle state, or performing step C if the terminal is in an operating state;

C. responding to the received request for calling the service when the requested service has a high priority, or refusing to respond to the received request for calling the service when the requested service does not have a high priority.

Figure 2:
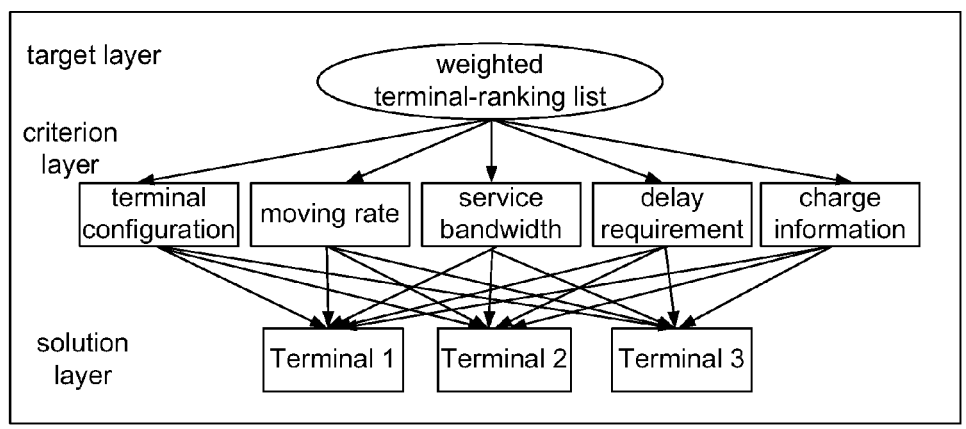
FIG. 2 is a diagram of generating a weighted terminal-ranking list via an analytic hierarchy process in an embodiment of the disclosure.

The mobility management platform may generate a weighted terminal-ranking list of any terminal responding to a same request for calling a service via an analytic hierarchy process specifically according to information on a parameter of capability of a terminal responding to the request for calling the service, including information on a terminal configuration, a moving rate, a service bandwidth, a delay requirement, and charge information, etc. The analytic hierarchy process, as shown in FIG. 2, may include three layers, i.e., a target layer, a criterion layer and a solution layer; the target layer may include a weighted terminal-ranking list; the criterion layer may include a criterion for analyzing the terminal configuration, the moving rate, the service bandwidth, the delay requirement, and the charge information; the solution layer may include any terminal responding to the same request for calling a service, such as Terminal 1, Terminal 2, and Terminal 3. In other words, the criterion layer may assign, to an aforementioned parameter, a weight corresponding to a task of the target layer; a terminal in the solution layer may also assign, to an aforementioned parameter, a weight corresponding to the capability of the terminal itself; finally, the weighted terminal-ranking list may be generated according to an algorithm relevant to the analytic hierarchy process according to both weights. Such an analytic hierarchy process is known in the art and will not be elaborated herein.

The service-center authenticating message may include a service-center-replacement triggering condition.

A service center may send a service-center-replacement application to the mobility management platform when a service-center-replacement triggering condition is met, where the service-center-replacement triggering condition may include: a power supply of the service center running lower than a set threshold; an index such as a network signal strength or a bandwidth being lower than a set threshold; the service center quitting a group due to a reason such as a space, a distance, or the like; the service center stopping operation due to a failure per se; and a change in a service going beyond the capability of the service center.

Step 101 may further include steps as follows: after the mobility management platform receives a request for a service, information on a type of the service and a priority of the service included in the request for the service is extracted, a communication parameter of a wireless network such as a signal strength or a delay is collected, a weight is assigned to the communication parameter, and the mobility management platform allocates a wireless network resource for the requested service based on fuzzy logics and neural network technology.

The mobility management platform may allocate a wireless network resource for the requested service based on fuzzy logics and neural network technology specifically by: acquiring a network-access-decision parameter by performing network-access calculation on the collected communication parameter based on a particle-swarm-optimization fuzzy neuron, and allocating the wireless network resource for the requested service according to the network-access-decision parameter. A specific example is described as follows.

Take for example two heterogeneous wireless networks of 3G and Wifi, denoted by Network 1 and Network 2, respectively. $X_1$, is defined as the difference between signal strengths of Network 1 and Network 2, $X_2$ is defined as the difference between delays of Network 1 and Network 2, and $X_3$ is defined as a matching degree between the type of a service and a network. Taking $X_1$, $X_2$, and $X_3$ as input parameters of a fuzzy neuron, a fuzzy decision factor F may be obtained:

$$F = K(k) \sum_{i=1}^{3} w_i(k) X_i(k),$$

where K is a neuronal gain, $w_i$ is a weighting coefficient corresponding to an input parameter $X_i$. Allocation for network access is accomplished according to the value of the fuzzy decision factor F. When F<1, Network 1 is accessed.

When F>1, Network 2 is accessed. When F=1, a network with a higher matching degree with the service is accessed.

In step 102, the service center of the service configures a terminal environment according to the request for calling the service to which the service center of the service responds, and uploads information on the configured terminal environment to the mobility management platform.

In an embodiment, a service center configures, in response to a request for calling a service sent by the mobility management platform, the terminal environment required in performing the service and a strategy of service transmission by streams according to information on a parameter of capability of a terminal responding to the request for calling the service other than the service center itself, and uploads information on the configured terminal environment to the mobility management platform, the information on the configured terminal environment including the terminal environment required in performing the service and the strategy of service transmission by streams.

The method may further include that: the mobility management platform sends a service flow to a terminal responding to the request for calling a service according to information on the terminal environment uploaded by the service center of the service.

Figure 3:
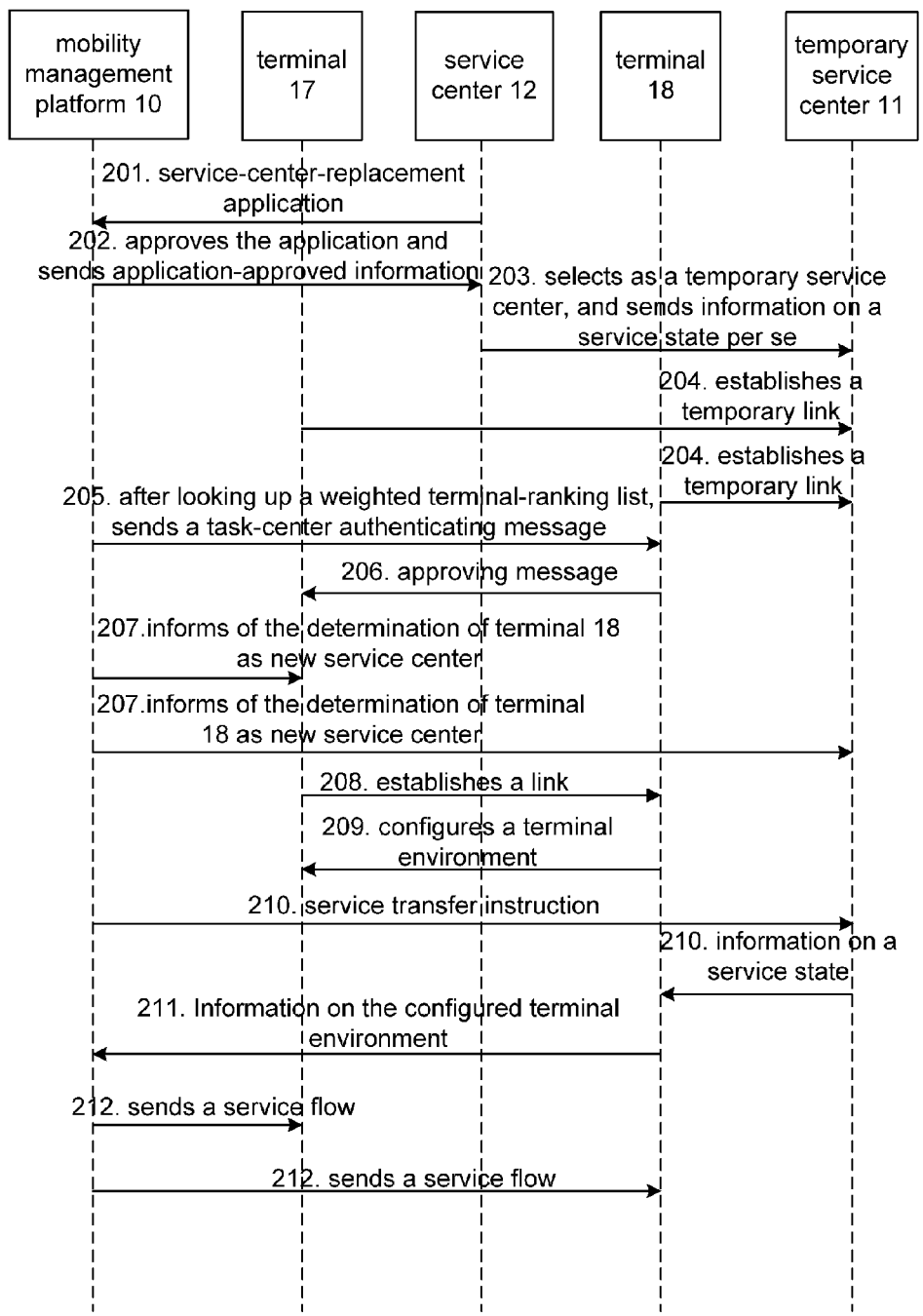
FIG. 3 is a flow chart of service-center replacement in an embodiment of the disclosure.

With the method, when multiple services are in progress, each service has a corresponding service center, and service centers may transmit service flows in parallel. For example, service centers may simultaneously perform operations such as data downloading. The method may also include that: when a single-point failure occurs at a service center, and the service center meets a service-center-replacement triggering condition, the service center sends a service-center-replacement application to the mobility management platform, and after receiving application-approved information sent by the mobility management platform, selects a service center other than the service center itself as a temporary service center; after the mobility management platform determines a new service center according to a weighted terminal-ranking list, the new service center replaces the temporary service center in configuring the terminal environment and uploading the information on the configured terminal environment to the mobility management platform. The mobility management platform sends a service flow according to the information on the terminal environment uploaded by the new service center. Specific steps are as shown in FIG. 3, included wherein are a terminal home server, a mobility management platform 10, a service center 12, a temporary service center 11, a terminal 17, a terminal 18.

Step 201: when meeting a service-center-replacement triggering condition, a service center 12 sends a service-center-replacement application to a mobility management platform 10.

In this step, the service center 12 may send a service-center-replacement application to the mobility management platform 10 when meeting a service-center-replacement triggering condition, where the service-center-replacement triggering condition may include:

a power supply of the service center 12 running lower than a set threshold;

an index such as a network signal strength or a bandwidth being lower than a set threshold;

the service center 12 quitting a group due to a reason such as a space, a distance, or the like;

the service center 12 stopping operation due to a failure per se; and a change in a service going beyond the capability of the service center 12.

Step 202: after receiving the service-center-replacement application, the mobility management platform 10 approves the application, and sends application-approved information to the service center 12.

Step 203: the service center 12 selects a service center 11 other than the service center 12 itself as a temporary service center, and sends information on a service state of the service center 12 to the temporary service center 11.

In this step, the service center 12 selects a service center other than the service center 12 itself as a temporary service center 11, sends information on the service state per se to the temporary service center 11, and informs the terminal 17, the terminal 18 to establish a temporary link with the temporary service center 11. The temporary service center 11 continues a service according to the information on the service state. The temporary service center 11 may be selected according to a type of the service, information on a parameter of terminal capability, and a communication cost.

Step 204: the terminal 17, the terminal 18 establishes a temporary link respectively with the temporary service center 11.

Step 205: after looking up a weighted terminal-ranking list, the mobility management platform 10 sends a service-center authenticating message to the terminal 18 with a weight second to that of the original service center in the weighted terminal-ranking list.

Step 206: after receiving and approving the service-center authenticating message, the terminal 18 returns an approving message to the mobility management platform 10.

Step 207: after receiving the approving message, the mobility management platform 10 informs the terminal 17 and the temporary service center 11 of the determination of terminal 18 as a new service center.

Step 208: a temporary link is established between the terminal 17 and the terminal 18 such that a sub-group is formed.

Step 209: the terminal 18 configures a terminal environment.

In this step, the terminal 18 reconfigures, according to a request for calling a service sent by the mobility management platform 10, the terminal environment required in performing the service and a strategy of service transmission by streams according to information on a parameter of capability of a terminal in the sub-group.

Step 210: the mobility management platform 10 sends a service transfer instruction to the temporary service center 11, which then sends the information on a service state to the terminal 18

In this step, the mobility management platform 10 sends the service transfer instruction to the temporary service center 11, which then sends the information on the service state to the terminal 18 after verifying that the service transfer instruction is indeed sent by the mobility management platform 10.

Step 211: the terminal 18 uploads information on the configured terminal environment to the mobility management platform 10.

In this step, information on the terminal environment may include the terminal environment required in performing the service and the strategy of service transmission by streams that are reconfigured.

Step 212: the mobility management platform 10 sends service flows to the terminal 17 and the terminal 18 according to information on terminal configuration uploaded by the terminal 18.

Figure 4:
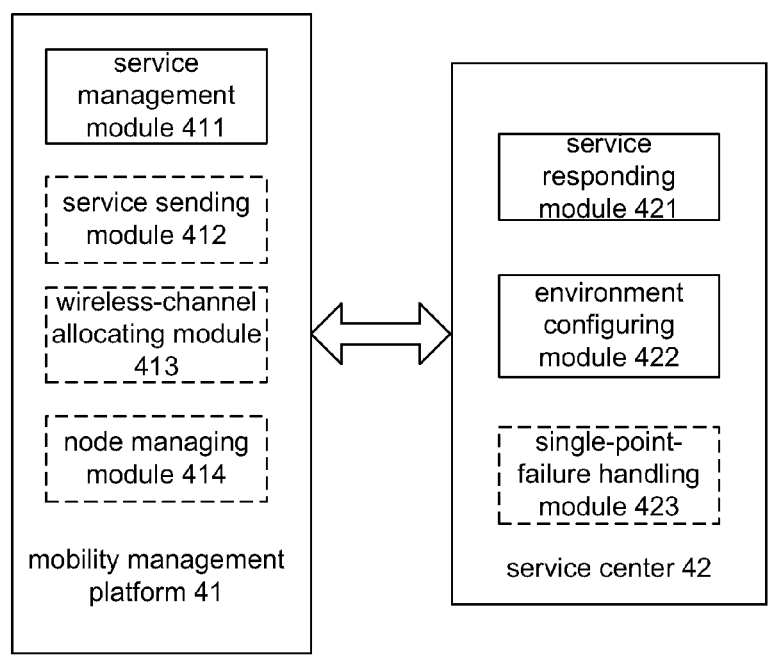
FIG. 4 is a diagram of a structure of a system for mobility management of group terminals based on multiple services and multiple centers implemented according to the disclosure.

To implement the aforementioned method, a system for mobility management of group terminals based on multiple services and multiple centers is also provided by the disclosure. As shown in FIG. 4, the system includes a mobility management platform 41 and multiple service centers 42.

The mobility management platform 41 is configured for sending a request for calling a service to a terminal of a group, and determining a terminal that responds to the request for calling the service as a service center 42 of the service.

A service center 42 is configured for: configuring a terminal environment according to a request for calling a service to which the service center responds, and uploading information on the configured terminal environment to the mobility management platform 41.

The mobility management platform 41 may specifically include a service management module 411 configured for: sending a request for calling a service to a terminal of a group, and determining a terminal that responds to the request for calling the service as the service center 42 of the service.

The service management module 411 may specifically be configured for: after receiving requests for various services, sending a request for calling a service to each terminal in a group; generating a weighted terminal-ranking list of any terminal responding to the same request for calling a service via an analytic hierarchy process; sending a service-center authenticating message to a terminal with a maximal weight in the weighted terminal-ranking list; and after receiving an approving message returned by the terminal with the maximal weight in the weighted terminal-ranking list, informing a terminal responding to the same request for calling the service other than the service center 42 of the determination of the terminal with the maximal weight in the weighted terminal-ranking list as the service center 42.

The mobility management platform 41 may further include a wireless-channel allocating module 413 configured for: after receiving a request for a service, extracting information on a type of the service and a priority of the service in the request for the service, collecting a communication parameter of a wireless network such as a signal strength or a delay, assigning a weight to the communication parameter, and allocating a wireless network resource for the requested service based on fuzzy logics and neural network technology.

The mobility management platform 41 may further include a node managing module 414 configured for: after receiving a service-center-replacement application sent by the service center 42, returning application-approved information, determining a new service center according to a weighted terminal-ranking list, and sending a service flow according to information on a terminal environment uploaded by the new service center.

The mobility management platform 41 may further include a service sending module 412 configured for sending a service flow to a terminal responding to a request for calling a service according to information on a terminal environment uploaded by a service center 42.

A service center 42 may include a service responding module 421 and an environment configuring module 422.

The service responding module 421 may be configured for receiving and responding to a request for calling a service sent by the mobility management platform 41.

The environment configuring module 422 may be configured for configuring a terminal environment according to a request for calling a service, and uploading information on the configured terminal environment to the mobility management platform 41.

The service responding module 421 may specifically be configured for: after receiving a request for calling a service sent by the mobility management platform 41, responding to the request for calling the service when it is determined that a capability of the terminal matches a type of the service and the terminal is in an idle state, or when it is determined that a capability of the terminal matches a type of the service, the terminal is in an operating state, and the requested service has a high priority.

The service center 42 may further include a single-point-failure handling module 423 configured for: when the service center meets a service-center-replacement triggering condition, sending a service-center-replacement application to the mobility management platform 41, and after receiving application-approved information sent by the mobility management platform, selecting a service center other than the local service center as a temporary service center.

Based on the above system, a mobility management platform is also provided by the disclosure. As shown in FIG. 4, the mobility management platform 41 includes a service management module 411 configured for: sending a request for calling a service to a terminal of a group, and determining a terminal that responds to the request for calling the service as a service center 42 of the service.

The service management module 411 may specifically be configured for: after receiving requests for various services, sending a request for calling a service to each terminal in a group; generating a weighted terminal-ranking list of any terminal responding to the same request for calling a service via an analytic hierarchy process; sending a service-center authenticating message to a terminal with a maximal weight in the weighted terminal-ranking list; and after receiving an approving message returned by the terminal with the maximal weight in the weighted terminal-ranking list, informing a terminal responding to the same request for calling the service other than the service center 42 of the determination of the terminal with the maximal weight in the weighted terminal-ranking list as the service center 42.

The mobility management platform 41 may further include a wireless-channel allocating module 413 configured for: after receiving a request for a service, extracting information on a type of the service and a priority of the service in the request for the service, collecting a communication parameter of a wireless network such as a signal strength or a delay, assigning a weight to the communication parameter, and allocating a wireless network resource for the requested service based on fuzzy logics and neural network technology.

The mobility management platform 41 may further include a node managing module 414 configured for: after receiving a service-center-replacement application sent by the service center 42, returning application-approved information, determining a new service center according to a weighted terminal-ranking list, and sending a service flow according to information on a terminal environment uploaded by the new service center.

The mobility management platform 41 may further include a service sending module 412 configured for sending a service flow to a terminal responding to a request for calling a service according to information on a terminal environment uploaded by a service center 42.

Based on the above system, a service center is also provided by the disclosure. As shown in FIG. 4, the service center 42 includes:

a service responding module 421 configured for receiving and responding to a request for calling a service sent by the mobility management platform 41; and an environment configuring module 422 configured for configuring a terminal environment according to a request for calling a service, and uploading information on the configured terminal environment to the mobility management platform 41.

The service responding module 421 may specifically be configured for: after receiving a request for calling a service sent by the mobility management platform 41, responding to the request for calling the service when it is determined that a capability of the terminal matches a type of the service and the terminal is in an idle state, or when it is determined that a capability of the terminal matches a type of the service, the terminal is in an operating state, and the requested service has a high priority.

The service center 42 may further include a single-point-failure handling module 423 configured for: when the service center meets a service-center-replacement triggering condition, sending a service-center-replacement application to the mobility management platform 41, and after receiving application-approved information sent by the mobility management platform, selecting a service center other than the local service center as a temporary service center.

An embodiment of applying a solution of the disclosure is given below.

The embodiment relates to network-resource allocation during multi-service group movement, service continuity and center replacement under the circumstance of single-point failure during group movement.

A type of a service in the embodiment includes: a video service delivering circumstances of a fire site, casualties, and the like through images, so as to provide a reference for service arrangement by a commander upon reaching the site; a traffic navigation service providing real-time information on roads to firemen and providing optimal driving directions such that a fire engine may arrive at a fire site as soon as possible; and a message service informing a commander of personnel, equipments, and neighboring units and providing a basis for unified scheduling upon reaching a site.

Firstly, the mobility management platform calculates a matching value between a service and a network based on a type and a priority of the service and a parameter of real-time performance of the network. Wireless network resources allocated for services by the mobility management platform according to matching values are as shown in Table 1.

TABLE 1

| service type | service use | allocated network |
| --- | --- | --- |
| video service | circumstances of a fire site (fire, casualties, etc) | 3G network/Wifi network |
| navigation service | traffic and road information | GPS network/Compass navigation network |
| message service | personnel, equipments, and neighboring units | mobile cellular network |

The mobility management platform determines service centers, each responsible of service-stream sending for a respective video, navigation, or message service. When a single-point failure occurs at a service center, taking herein a navigation service for example, a service center of the navigation service (where a single-point failure occurs due to network signal interruption or a failure) selects the service center of the video service as a temporary service center of the navigation service to provide the navigation service to a group; when a new service center of the navigation service is determined, the service center of the video service hands the navigation service over to the new service center. With a center replacing flow, no interruption occurs to a navigation service during service execution, ensuring success of a fire extinction service.

What describe are merely embodiments of the disclosure, and are not intended to limit the scope of the disclosure.

The invention claimed is:

1. A method for mobility management of group terminals, comprising steps of:
   sending, by a mobility management platform, a request for calling a service to a terminal of a group, and determining a terminal responding to the request for calling the service as a service center of the service; and
   configuring, by the service center of the service, a terminal environment according to the request for calling the service to which the service center of the service responds, and uploading information on the configured terminal environment to the mobility management platform.

2. The method according to claim 1, wherein the step of determining a terminal responding to the request for calling the service as a service center of the service comprises: generating, by the mobility management platform, a weighted terminal-ranking list of any terminal responding to the request for calling the service via an analytic hierarchy process; sending a service-center authenticating message to a terminal with a maximal weight in the weighted terminal-ranking list; and after receiving an approving message returned by the terminal with the maximal weight in the weighted terminal-ranking list, informing a terminal responding to the request for calling the service other than the service center of the determination of the terminal with the maximal weight in the weighted terminal-ranking list as the service center.

3. The method according to claim 2, wherein the service-center authenticating message comprises a service-center-replacement triggering condition; and
   the method further comprises steps of: when the service center meets the service-center-replacement triggering condition, sending, by the service center, a service-center-replacement application to the mobility management platform, and after receiving application-approved information sent by the mobility management platform, selecting a service center other than the service center itself as a temporary service center; after the mobility management platform determines a new service center according to the weighted terminal-ranking list, replacing, by the new service center, the temporary service center in configuring the terminal environment and uploading the information on the configured terminal environment to the mobility management platform.

4. The method according to claim 1, wherein the request for calling the service comprises a type of the service and a priority of the service; and
   a terminal responds to the received request for calling the service when it is determined that a capability of the terminal matches the type of the service and the terminal is in an idle state, or when it is determined that a capability of the terminal matches the type of the service, the terminal is in an operating state, and the requested service has a high priority.

5. The method according to claim 1, further comprising steps of: after receiving a request for the service, extracting, by the mobility management platform, information on a type of the service and a priority of the service in the request for the service, collecting a communication parameter of a wireless network, assigning a weight to the communication parameter, and allocating a wireless network resource for the service based on fuzzy logics and neural network technology.

6. The method according to claim 5, wherein the step of allocating a wireless network resource for the service based on fuzzy logics and neural network technology comprises: acquiring a network-access-decision parameter by performing network-access calculation on the collected communication parameter based on a particle-swarm-optimization fuzzy neuron, and allocating the wireless network resource for the requested service according to the network-access-decision parameter.

7. The method according to claim 1, wherein service centers transmit service flows in parallel.

8. A system for mobility management of group terminals, comprising a mobility management platform and a service center, wherein
the mobility management platform is configured for: sending a request for calling a service to a terminal of a group, and determining a terminal that responds to the request for calling the service as the service center of the service; and
the service center is configured for: configuring a terminal environment according to the request for calling the service to which the service center responds, and uploading information on the configured terminal environment to the mobility management platform.

9. The system according to claim 8, wherein the mobility management platform comprises:
a service management module configured for: sending the request for calling the service to a terminal of the group, and determining a terminal that responds to the request for calling the service as the service center of the service;
a wireless-channel allocating module configured for: after receiving a request for the service, extracting information on a type of the service and a priority of the service in the request for the service, collecting a communication parameter of a wireless network, assigning a weight to the communication parameter, and allocating a wireless network resource for the service based on fuzzy logics and neural network technology; and
a node managing module configured for: after receiving a service-center-replacement application sent by the service center, returning application-approved information, determining a new service center according to a weighted terminal-ranking list, and sending a service flow according to the information on the terminal environment uploaded by the new service center.

10. The system according to claim 8, wherein the service center comprises a service responding module and an environment configuring module, wherein
the service responding module is configured for: receiving and responding to the request for calling the service sent by the mobility management platform; and
the environment configuring module is configured for: configuring the terminal environment according to the request for calling the service, and uploading information on the configured terminal environment to the mobility management platform,
wherein the service responding module is further configured for: after receiving the request for calling the service sent by the mobility management platform, responding to the request for calling the service when it is determined that a capability of the terminal matches a type of the service and the terminal is in an idle state, or when it is determined that a capability of the terminal matches a type of the service, the terminal is in an operating state, and the requested service has a high priority; and
the service center further comprises a single-point-failure handling module configured for: when the service center meets a service-center-replacement triggering condition, sending a service-center-replacement application to the mobility management platform, and after receiving application-approved information sent by the mobility management platform, selecting a service center other than the local service center as a temporary service center.

11. A mobility management platform, comprising:
at least one hardware processor;
memory in electronic communication with the at least one hardware processor; and
instructions stored in the memory, the instructions being executable by the at least one hardware processor for:
receiving a request for a service sent by a user through a terminal;
sending a request for calling the service to a terminal of a group;
receiving a response to the request for calling the service sent by a terminal that has received the request for calling the service and determined to respond to the request for calling the service;
determining a terminal that responds to the request for calling the service as a service center of the service;
sending a service-center authenticating message to the determined service center of the service;
receiving an approving message returned by the determined service center of the service;
informing a terminal that responds to the request for calling the service, other than the determined service center, of the determined service center;
receiving information on a terminal environment uploaded by the service center; and
sending a service flow to a terminal that responds to the request for calling the service according to the information on the terminal environment uploaded by the service center.

12. The mobility management platform according to claim 11, wherein the instructions are executable by the at least one hardware processor for: after receiving the request for the service, extracting information on a type of the service and a priority of the service in the request for the service, collecting a communication parameter of a wireless network, assigning a weight to the communication parameter, and allocating a wireless network resource for the service based on fuzzy logics and neural network technology.

13. The mobility management platform according to claim 11, wherein the instructions are executable by the at least one hardware processor for: after receiving a service-center-replacement application sent by the service center, returning application-approved information, determining a new service center according to a weighted terminal-ranking list, and sending a service flow according to information on a terminal environment uploaded by the new service center.

14. A service center, comprising a service responding module and an environment configuring module, wherein
the service responding module is configured for: receiving and responding to a request for calling a service sent by a mobility management platform; and
the environment configuring module is configured for: configuring a terminal environment according to the request for calling the service, and uploading information on the configured terminal environment to the mobility management platform.

15. The service center according to claim 14, wherein the service responding module is configured for: after receiving the request for calling the service sent by the mobility management platform, responding to the request for calling the service when it is determined that a capability of the service center matches a type of the service and the service center is in an idle state, or when it is determined that a capability of the service center matches a type of the service, the service center is in an operating state, and the requested service has a high priority; and the service center further comprises a single-point-failure handling module configured for: when the service center meets a service-center-replacement triggering condition, sending a service-center-replacement application to the mobility management platform, and after receiving application-approved information sent by the mobility management platform, selecting a service center other than the local service center as a temporary service center.

* * * * *